Nov. 27, 1956
P. H. WILSON
2,772,067
TIME CONTROL VALVE
Filed March 23, 1953
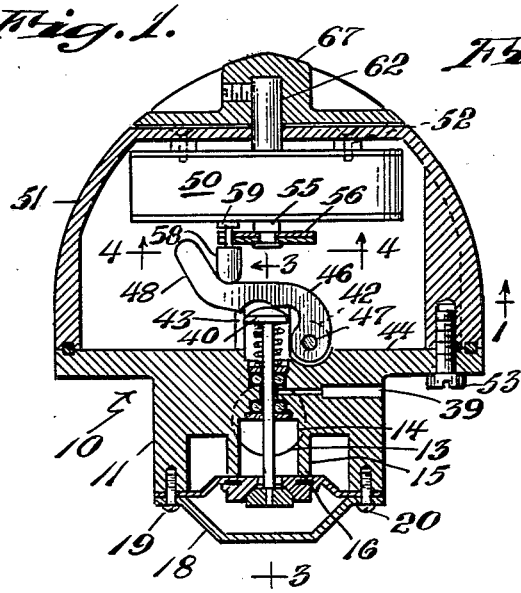
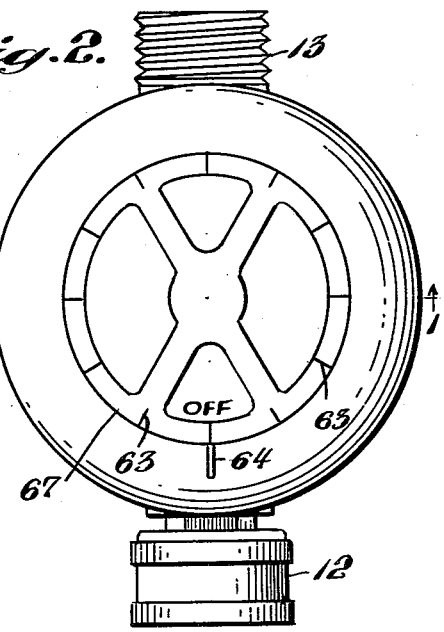
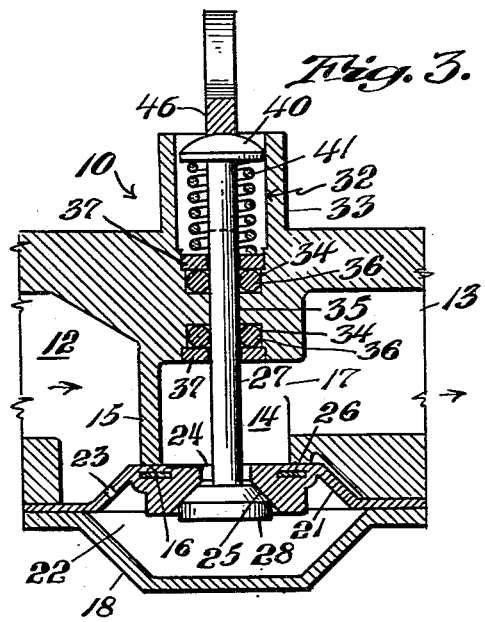
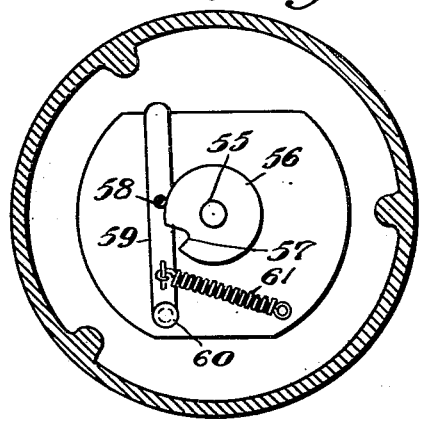
INVENTOR.
Peter H. Wilson
BY
Barlow & Barlow
ATTORNEYS.

United States Patent Office 2,772,067
Patented Nov. 27, 1956

2,772,067

TIME CONTROL VALVE

Peter H. Wilson, Barrington, R. I.

Application March 23, 1953, Serial No. 343,940

2 Claims. (Cl. 251—240)

This invention relates to a time control valve.

In many instances such for instance as in the watering of a lawn or in photography where pictures are being washed or in many other cases it is desirable to have the flow of water terminate after a certain period of time, and usually it requires the attention of some operator or workman in order to accomplish the termination of this flow.

One of the objects of this invention is to provide a simple time operated valve which may be inserted in the flow line of water and control the water so that the flow may be terminated after a certain length of time.

Another object of this invention is to provide a simple valve which will be positive in its operation and durable in length of service.

Another object of this invention is to provide a construction in which the pressure of the water is utilized to maintain the valve in its closed position or its open position after once moved to such position.

Another object of this invention is to provide a valve which may be operated by timing units which may be purchased on the market.

With these and other objects in view, the invention consists of certain novel features of construction as will be more fully described and particularly pointed out in the appended claims.

In the accompanying drawings:

Figure 1 is a sectional view taken substantially along line 1—1 of Figure 2 of the valve with the timing device in position thereon;

Figure 2 is a top plan view of the structure;

Figure 3 is a sectional view on line 3—3 of Figure 1 on an enlarged scale;

Figure 4 is a sectional view on line 4—4 of Figure 1.

In proceeding with this invention, I have provided a unit which may be considered as in two parts, one part being the timer and the other part being the valve. The timer controls the valve part, being separable therefrom. The valve consists essentially of a diaphragm as the main conduit control with a pilot valve in the diaphragm for convenience in operating the diaphragm and with a bleed hole through the diaphragm for slowly transmitting pressure from one side to the other.

With reference to the drawing 10 designates generally a valve unit comprising a body 11 having an inlet opening at 12 and a discharge opening at 13. A conduit extends from the inlet opening to the discharge opening through a bore 14 surrounded by a cylindrical wall 15 with its circular edge 16 providing a sealing seat. The discharge passage is connected to the bore 14 as at 17, while the inlet passage 12 communicates with the bore 14 only through the encircling sealing seat 16. Thus the flow through the bore 14 is generally at right angles to the direction of entrance and direction of exit of the fluid to and from the valve body. On one side of the body opposite and in axial alignment with the bore 14 is an opening in the cast casing 11 which is closed by a bulging cover 18 secured to the body by screws 19 and 20. Between this cover and the body a flexible diaphragm 21 of some rubber or synthetic rubber-like material is provided which is bound at its peripheral edges as the cover is secured in position, thus providing a chamber 22 between the diaphragm and the cover. The diaphragm is flexible through a substantial extent at right angles to its bound peripheral edge and extends into engagement with the seat 16 and provides a main valve closure for controlling the flow of fluid through bore 14. When the diaphragm is in open position (not shown), fluid will flow from the inlet 12 through the bore 14 out through opening 17 and through the discharge 13. The diaphragm on one side is subjected to the pressure of the fluid at the inlet 12 acting thereon in a direction tending to unseat the diaphragm from the seat 16.

This diaphragm 21 is provided with a bleed hole 23 which is so located that communication is had from the chamber 22 to the inlet side of the conduit 12. Thus, the high pressure of fluid at this inlet may be slowly transmitted through the diaphragm to the chamber 22 until this pressure is equalized with pressure at the inlet conduit. Thus, the other side of the diaphragm is also subjected to the inlet 12 pressure. The effective area on this other side of the diaphragm subjected to inlet pressure tending to move the diaphragm to seated position is greater than that of the opposite effective area subjected to inlet pressure tending to move the diaphragm to unseated position. A control opening 24 about which a valve seat 25 is formed is provided at the mid point of the diaphragm, and the diaphragm is reinforced by a metal annulus 26 which is embedded in place. A closure valve for said seat 25 has a stem 27 at the lower end of which is fixed a plug 28 made of a soft resilient rubber-like material to engage the seat 25 to close the opening 24 to the passage of fluid therethrough.

The body 10 is provided with a bore designated generally 32 which extends inwardly from the upper side of the body to open into the bore 14 concentric therewith. The bore 32 is surrounded at its upper portion by a boss 33 and is reduced at spaced locations as at 34 and further reduced between the portions 34 as at 35 to provide a bearing through which the valve stem 27 may slidably extend. This valve stem is sealed to the passage of fluid thereby as by means of O-rings 36 which are received in the bore portions 34 and retained in place by washers 37 which in turn are frictionally secured to the walls of the portions 34. A bleed hole 39 (Figure 1) extends from a location between these seals to the outside so that should any fluid escape from the bore 14 along the surface of the stem 27 when under pressure, it will leak out of the casing rather than up into a housing over the end of the valve stem. The valve stem extends into the upper portion of the bore 32 surrounded by the boss 33 and has a head 40 which slidably bears against the wall of said portion of the bore 32. A helical spring 41 is positioned between the head 40 and the upper surface of the washers 37 and tends to move the valve stem so as to bias the plug 28 into engagement with the seat 25.

The boss 33 is enlarged at one side thereof as at 42 and is slotted as at 43 centrally therethrough and through the enlarged portion 42. A lever 46 is received in the slot 43 and is pivoted on the enlarged portion as at 47. The lever 46 extends upwardly and then generally horizontal into engagement with the head 40 and has a portion 48 which extends generally upwardly on an incline as shown. The lever 46 is rocked about the pivot 47 in a counter-clockwise direction to depress the stem 27 to unseat the plug 28.

A spring clock timing unit 50 is secured in the bell-shaped casing 51 by screws 52, and the casing is secured on the valve casing 10 by means of screws 53. This unit 50 has a shaft 55 extending downwardly upon which there is mounted a cam 56 having a notch 57. A cam follower 58 mounted on a lever 59 pivoted on the unit 50 as at 60 is adapted to ride on the periphery of the cam 56 and engage in the notch 57. A pull spring 61 biases the lever 59 towards the cam. The follower 58 projects into engagement with the portion 48 of lever 46. When the unit 50 is at rest, the follower 58 will be nesting in the notch 57. Upon the unit 50 being set into motion, the follower 58 will be moved radially out of the notch 57 and engage the periphery of the cam. The radial movement of the follower will through engagement of the portion 48 rock the lever 46 counter-clockwise and unseat the plug 28.

A handle 67 is secured on the stem 62 of the unit 50 through which the unit is set into motion. The handle 67 is in the form of a dial which may be graduated in equal periods of time indicated by marks 63. The arrangement is such that by turning the handle 67 until the desired mark 63 registers with the mark 64 on the part 51, the spring within the unit 50 is energized and the clock mechanism permits the handle to gradually move back to zero position indicated by the mark 64. The notch 57 will now be positioned opposite the follower 58, and the follower under urge of spring 61 will be moved into the said notch 57 or zero position.

Assuming that the valve was closed as shown and it was desired to start up the fluid which is controlled by the valve, the handle 67 would be turned to the chosen dial marker 63 indicating the number of minutes that it was desired that the water should run. This movement at once, as explained above, would press the stem 27 downwardly which would first unseat the pilot valve or plug 28. Such pressure as was then in the chamber 22 would pass outwardly through the opening 24 faster than the pressure could be supplied through the bleed hole 23, thus providing a differential pressure across the diaphragm in a direction for the inlet pressure to move the diaphragm to open position. Upon the opening of the diaphragm there will be a pressure drop about the inner side of the valve seat 16.

Assuming the clock mechanism has been in action for the time set and the cam 56 rotated by said mechanism to return the notch 57 opposite the follower 58, said follower will now ride off the periphery of the cam and into notch 57. This will free the pilot valve to move upwardly under pressure of spring 41 to reseat plug 28 on the valve seat 25 to close the opening 24. The pressure of the spring 41 is merely that required to bias the plug 28 to its seat 25. Upon closing of opening 24, pressure will now build up in chamber 22 through opening 23 to that of the inlet pressure. The effective area on the diaphragm on the side exposed to pressure in chamber 22 is larger than the effective area on the other side of the diaphragm exposed to inlet pressure, there being a drop in inlet pressure about the opening or valve seat 16 as previously stated. Thus, upon closing of opening 24, a pressure differential will be had across the diaphragm in a direction tending to move the same to closed position, and the diaphragm will move to the closed position.

I claim:
1. In a control valve having a conduit through which a fluid may pass from a source of supply, a valve seat along said conduit, a valve plug engaging said seat for controlling the fluid flow, a rockable arm pivoted at one side of the line of movement of said plug and engaging said valve plug to move the same from said seat, a cam rotatable about an axis at right angles to the axis of the rockable arm, a lever pivoted on an axis parallel to the axis of the cam and carrying a cam follower, means to move said lever to cause said follower to engage said cam, said arm having a portion inclined to the path of movement of said follower, said follower also engaging the inclined portion of said rockable arm to actuate the same in response to the movement of said cam.

2. In a control valve having a conduit through which a fluid may pass from a source of supply, a valve seat along said conduit, a valve plug engaging said seat for controlling the fluid flow, a rockable arm pivoted at one side of the line of movement of said plug on an axis at right angles to said movement and engaging said valve plug to move the same from its seat, a rotatable circular disk pivoted on an axis parallel to the axis of said plug and having a notch in the periphery thereof, a pivoted lever carrying a cam follower on one side of the lever to engage said disk, said follower extending to also engage said arm, and a resilient bias on said lever urging the same to swing in a direction for said follower to engage in said notch, said arm having a portion inclined to the path of movement of said follower, whereby upon rotation of said disk said follower will be moved out of said notch to ride along the periphery of said disk whereupon said follower will slide along said inclined portion to actuate said arm to move said valve plug to open position during engagement of said follower with the periphery of said disk.

References Cited in the file of this patent

UNITED STATES PATENTS

| | | |
|---|---|---|
| 558,544 | Wojan | Apr. 21, 1896 |
| 870,597 | Tschopik et al. | Nov. 12, 1907 |
| 2,192,578 | Michaels | Mar. 5, 1940 |
| 2,194,243 | Kronmiller et al. | Mar. 19, 1940 |
| 2,305,151 | Fields | Dec. 15, 1942 |
| 2,315,774 | Couzens | Apr. 6, 1943 |
| 2,338,804 | Drane | June 11, 1944 |
| 2,527,851 | Ray | Oct. 31, 1950 |
| 2,635,691 | Filliung | Apr. 21, 1953 |
| 2,661,577 | Hanson | Dec. 8, 1953 |

FOREIGN PATENTS

| | | |
|---|---|---|
| 2,903 | Great Britain | Nov. 3, 1870 |